(12) United States Patent
Hansen et al.

(10) Patent No.: US 8,343,685 B2
(45) Date of Patent: Jan. 1, 2013

(54) COMPOSITE MATERIAL SUITABLE FOR USE AS AN ELECTRODE MATERIAL IN A SOC

(75) Inventors: Kent Kammer Hansen, Ølstykke (DK); Martin Søgaard, Ringe (DK); Mogens Mogensen, Lynge (DK)

(73) Assignee: Technical University of Denmark, KGS. Lyngby (DK)

( * ) Notice: Subject to any disclaimer, the term of this patent is extended or adjusted under 35 U.S.C. 154(b) by 480 days.

(21) Appl. No.: 12/525,242

(22) PCT Filed: Jan. 25, 2008

(86) PCT No.: PCT/EP2008/000598
§ 371 (c)(1),
(2), (4) Date: Jan. 5, 2010

(87) PCT Pub. No.: WO2008/092608
PCT Pub. Date: Aug. 7, 2008

(65) Prior Publication Data
US 2010/0112407 A1    May 6, 2010

(30) Foreign Application Priority Data

Jan. 31, 2007   (EP) ..................... 07002107

(51) Int. Cl.
*H01M 4/48*   (2010.01)
(52) U.S. Cl. ................ 429/489; 429/488; 252/182.1
(58) Field of Classification Search ............ 429/33
See application file for complete search history.

(56) References Cited

U.S. PATENT DOCUMENTS 4,145,592 A   3/1979 Mizukawa et al.
(Continued)

FOREIGN PATENT DOCUMENTS

JP        52-86120       7/1977
(Continued)

OTHER PUBLICATIONS

Bae et al., "Properties of $La_{0.6}Sr_{0.4}Co_{0.2}Fe_{0.8}O_{3-\delta}$ (LSCF) double layer cathodes on gadolinium-doped cerium oxide (CGO) electrolytes. I. Role of $SiO_2$," *Solid State Ionics 106*: 247-253, 1998.

(Continued)

*Primary Examiner* — Barbara Gilliam
*Assistant Examiner* — Gary Harris
(74) *Attorney, Agent, or Firm* — Seed IP Law Group PLLC

(57) ABSTRACT

The present invention relates to composite material suitable for use as an electrode material in a solid oxide cell, said composite material consist of at least two non-miscible mixed ionic and electronic conductors. Further provided is a composite material suitable for use as an electrode material in a solid oxide cell, said composite material being based on $(Gd_{1-x}Sr_x)_{1-s}Fe_{1-y}Co_yO_{3-\delta}$ or $(Ln_{1-x}Sr_x)_{1-s}Fe_{1-y}Cio_yO_{3-\delta1}$ (s equal to 0.05 or larger) wherein Ln is a lanthanide element, Sc or Y, said composite material comprising at least two phases which are non-miscible, said composite material being obtainable by the glycine nitrate combustion method. Said composite material may be used for proving an electrode material in the form of at least a two-phase system showing a very low area specific resistance of around 0.1 $\Omega cm^2$ at around 600° C.

10 Claims, 7 Drawing Sheets

U.S. PATENT DOCUMENTS

| | | | |
|---|---|---|---|
| 4,950,562 A * | 8/1990 | Yoshida et al. | 429/457 |
| 6,280,868 B1 | 8/2001 | Badwal et al. | 429/34 |
| 7,122,268 B2 | 10/2006 | Hatano et al. | 429/41 |
| 2007/0009784 A1 * | 1/2007 | Pal et al. | 429/45 |

FOREIGN PATENT DOCUMENTS

| | | |
|---|---|---|
| JP | 7245107 A | 9/1995 |
| JP | 2000506671 A | 5/2000 |
| JP | 2001351646 A | 12/2001 |
| JP | 2002-237377 A | 8/2002 |
| JP | 2002319413 A | 10/2002 |
| JP | 2003187811 A | 7/2003 |
| JP | 2007-184180 A | 7/2007 |
| RU | 2280297 C2 | 7/2006 |
| WO | WO 97/35349 A1 | 9/1997 |
| WO | WO 02/058169 A2 | 7/2002 |

OTHER PUBLICATIONS

Dyck et al., "Crystal structure, thermal expansion and electrical conductivity of dual-phase $Gd_{0.8}Sr_{0.2}Co_{1-\gamma}Fe_\gamma O_{3-\delta}$ ($0 \leq \gamma \leq 1.0$)," *Solid State Ionics 176*: 103-108, 2005.

Ji et al., "Single intermedium-temperature SOFC prepared by glycine-nitrate process," *Journal of Alloys and Compounds 353*: 257-262, 2003.

Kammer, "Studies of Fe-Co based perovskite cathodes with different A-site cations," *Solid State Ionics 177*: 1047-1051, 2006.

Kostogloudis et al., "Chemical reactivity of perovskite oxide SOFC cathodes and yttria stabilized zirconia," *Solid State Ionics 135*: 529-535, 2000.

Mai et al., "Ferrite-based perovskites as cathode materials for anode-supported solid oxide fuel cells. Part I. Variation of composition," *Solid State Ionics 176*: 1341-1350, 2005.

Riza et al., "Preparation and characterization of $Ln_{0.8}Sr_{0.2}Fe_{0.8}Co_{0.2}O_{3-x}$ (Ln=La, Pr, Nd, Sm, Eu, Gd)," *Journal of European Ceramic Society 21*: 1769-1773, 2001.

Steele et al., "Properties of $La_{0.6}Sr_{0.4}Co_{0.2}Fe_{0.8}O_{3-\delta}$ (LSCF) double layer cathodes on gadolinium-doped cerium oxide (CGO) electrolytes. II. Role of oxygen exchange and diffusion," *Solid State Ionics 106*: 255-261, 1998.

Wang et al., "High-performance lanthanum-ferrite-based cathode for SOFC," *Solid State Ionics 176*: 457-462, 2005.

\* cited by examiner

US 8,343,685 B2

COMPOSITE MATERIAL SUITABLE FOR USE AS AN ELECTRODE MATERIAL IN A SOC

TECHNICAL FIELD

The present invention relates to a composite material suitable for use as an electrode material in a solid oxide cell (SOC), in particular a solid oxide fuel cell (SOFC) or a solid oxide electrolyser cell (SOEC). The SOFC or the SOEC is made from a solid oxide electrolyte and two electrodes, wherein at least one of the electrodes comprises said composite material.

BACKGROUND ART

Solid oxide cells generally include cells designed for different applications, such as solid oxide fuel cells, or solid oxide electrolyser cells. These types of cells are well known in the art. Typically, a solid oxide cell comprises an electrolyte layer sandwiched by two electrode layers. During operation, a temperature from about 400° C. to 1100° C. is used. One electrode is in contact with air whereas the other electrode is in contact with a fuel gas.

Due to cost reasons there is a desire to use inexpensive materials such as stainless steel for the supporting structure for the cell. Such materials are however only long-time stable below 800° C. At such temperatures, the most common cathode formed from LSM (Strontium substituted Lanthanum Manganite) does not have a sufficient activity, and thus other materials are needed, see W. G. Wang, R. Barfod, P. H. Larsen, K. Kammer, J. J. Bentzen, P. V. Hendriksen, M. Mogensen, Proc. of the 8th International Symposium on solid oxide fuel cells (SOFC-VIII), Paris, Apr. 27 to May 2, 2003. S. C. Singhal, M. Dokiya (eds.), p. 400 to 408 (The Electrochemical Society, Pennington, N.J.) (Proceedings volume PV 2003-07).

Other electrode materials are known which have a higher activity than LSM. An example of such a cathode is a composite of $La_{0.6}Sr_{0.4}Fe_{0.8}Co_{0.2}O_{3-\delta}$ with cerium-gadolinium oxide (CGO). The area specific resistance (ASR) of such a cathode is around 0.3 $\Omega cm^2$ at 600° C., see E. P. Murray, M. J. Sever, S. A. Barnett, *Solid State Ionics*, 148 27 (2002). Measured on a cone shaped electrode of $La_{0.6}Sr_{0.4}Fe_{0.8}Co_{0.2}O_{3-\delta}$ the ASR is around 100 $\Omega cm^2$ at 600° C., see K. Kammer, *Solid State Ionics*, 177 1047 (2006).

For compositions in the $Gd_{0.8}Sr_{0.2}Co_{1-y}Fe_yO_{3-\delta}$ ($0 \leq y \leq 1.0$) system, a stable dual-phase perovskite system could be shown. Said material is suggested for solid oxide fuel cells, see C. R. Dyck, R. C. Peterson, Z. B. Yu, V. D. Krstic, *Solid State Ionics*, 176 103-108 (2005).

Yuan Ji, Jiang Liu, Tianmin He, Ligong Cong, Jinxia Wang, Wenhui Su, *Journal of Alloys and Compounds*, 353 257-262 (2003), relates to single intermedium-temperature SOFCs. A combustion synthesis method, the glycerine-nitrate process, was used to prepare all nano-sized materials used in the single SOFC.

High performance LSCF/CGO composite cathodes have been produced in which the $R_p$ of 0.19 $\Omega cm^2$ at 600° C. and 0.026 $\Omega cm^2$ at 700° C. were obtained on a CGO electrolyte, see Wei Guo Wang, Mogens Mogensen, *Solid State Ionics*, 176 457-462 (2005).

G. Ch. Kostogloudis, G. Tsiniarakis, Ch. Ftikos, *Solid State Ionics*, 135 529-535 (2000) relates to the chemical reactivity of perovskite oxide SOFC cathodes and yttria stabilized zirconia.

Even though the ASR value of the composite $La_{0.6}Sr_{0.4}Fe_{0.8}Co_{0.2}O_{3-\delta}$/CGO as obtainable by the prior art is more than 3 times lower then the value of the classical LSM cathode, the ASR at 600° C. is still to high for many applications, and thus there is a strong desire to develop new electrodes with lower ASR values.

SUMMARY OF THE INVENTION

The present invention relates to a composite material suitable as an electrode material in a SOC. The composite material consists of at least two non-miscible mixed ionic and electronic conductors (MIEC's).

The present invention further relates to a composite material suitable for use as an electrode material in a solid oxide cell, said composite material being based on $(Gd_{1-x}Sr_x)_{1-s}Fe_{1-y}Co_yO_{3-\delta}$ or $(Ln_{1-x}Sr_x)_{1-s}Fe_{1-y}Co_yO_{3-\delta}$ (s equal to or higher than 0.05) wherein Ln is a lanthanide element, Sc or Y, said composite material comprising at least two phases which are non-miscible, said composite material being obtainable by the glycine nitrate combustion method.

The present invention relates in a second aspect to an electrode for use in a SOC comprising said composite material.

In a third aspect the invention relates to the use of the said composite material for an electrode material in a SOC.

In a forth aspect the invention relates to a SOC comprising an electrode material of said composite material.

Preferred embodiments are set forth in the sub claims and in the following detailed description.

DETAILED DESCRIPTION OF THE INVENTION

The present invention relates to a composite material suitable for use as an electrode material in a solid oxide cell, said composite material consisting of at least two non-miscible mixed ionic and electronic conductors (MIEC's). In the sense of the present invention, a MIEC is a material that under SOFC electrode operating conditions has both, a specific ionic conductivity of $10^{-3}$ S/cm or higher and a specific electronic conductivity of $10^{-2}$ S/cm or higher.

The composite material of the present invention advantageously has a very low area specific resistance of around 0.1 $\Omega cm^2$ and is especially suitable for use as an electrode material in a SOC at operating temperatures as low as about 600° C.

The performance of the composite material of the present invention is thus better than the performance of materials known from the prior art up to date and advantageously allows lowering of the operating temperature of SOC's which in turn results in a prolonged life time of the SOC. Additionally, a greater variety of materials can be employed in the SOC since the requirements for temperature resistance are lowered.

The composite material of the present invention is obtainable by the glycine nitrate combustion method, which is well known to a person skilled in the art. Generally, in said method precursor solutions are prepared from the respective metal nitrates and glycine, which is then heated to the point of self-ignition. Glycine serves as a fuel for combustion and as a complexing agent to prevent inhomogeneous precipitation of individual components prior to combustion.

Details about the glycine nitrate combustion method may be found, inter alia, in L. A. Chick, L. R. Pederson, G. D. Maupin, J. L. Bates, L. E. Thomas, G. J. Exarhos, *Materials Letters*, 10 6 (1990); and L. R. Pederson, G. D. Maupin, W. J. Weber, D. J. McReady, R. W. Stephens, *Materials Letters*, 10 437 (1991).

It has been found that advantageously, in the composite material of the present invention the first of the at least two phases has a relative large particle size and the second of the at least two phases has a relatively small particle size. The smaller particles of the second phase are located at the surface of the relatively larger particles of the first phase. More specifically, the particle size of the first of the at least two phases has a particle size of from about 0.5 to 60 μm, preferably from about 1 to 50 μm, and more preferably from about 2 to 40 μm. The second of the at least two phase has a particle size of less than 0.5 μm, wherein the particles of the second phase are located at the surface of the particles of the first phase.

Figure 6:
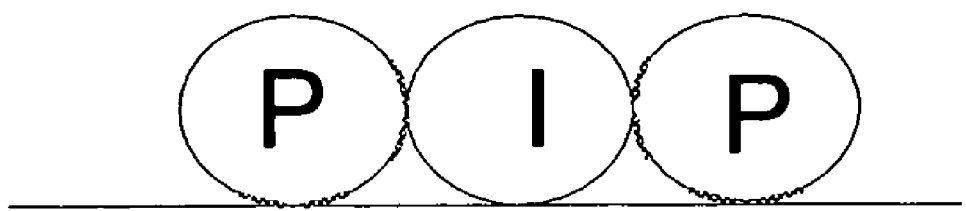
FIG. 6 schematically illustrates a structure comprising a particulate perovskite phase (P) and a particulate electrolyte phase (I). The three-phase boundary is illustrated with additional lines.
Figure 7:
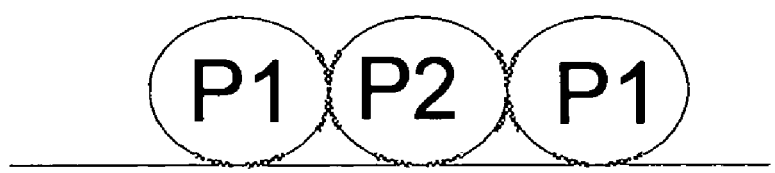
FIG. 7 schematically illustrates a structure accordingly to the invention comprising a particulate perovskite comprising two phases of mixed ionic and electronic conductors (P1 and P2). The three-phase boundary is illustrated with additional lines.

As illustrated in FIGS. 6 and 7, the unique microstructure of the composite material of the present invention increases the area of the three phase boundary, which leads to an enhancement of the electrochemical performance of the electrode. The three phase boundary is defined as the boundary where the two solid mixed ionic and electronic conductors meet each other and the gas phase. Furthermore, the active area available for the reduction of oxygen is increased due to the small particle size of the second phase.

Without restricting the invention to any specific theory, it is believed that the cathode of the present invention consists of a material which comprises at least two phases of mixed conductors, wherein both of said phases are capable of conducting both electrons and ions and at least two of said phases being good conductors of ions such as protons or oxide ions and electrons, and wherein the microstructure provides for large three-phase contact surfaces and a larger surface area. In FIG. 6, a structure is shown comprising a particulate perovskite phase (P) and a particulate electrolyte phase (I), also indicating three-phase boundary zone length and width of the active perovskite particles.

In FIG. 7, a structure is illustrated comprising a particulate perovskite comprising two phases of mixed conductors (P1 and P2), wherein both of said phases are capable of conducting both electrons and ions and at least two of said phases being good conductors of ions such as protons or oxide ions and electrons, and also indicating three-phase boundary zone length and width of the active perovskite particles being clearly greater than the three-phase contact surfaces of the embodiment shown in FIG. 6.

Preferably, at least two of the at least two non-miscible mixed ionic and electronic conductors comprise a material with the nominal composition $(Gd_{1-x}Sr_x)_{1-s}Fe_{1-y}Co_yO_{3-\delta}$. In the formula, x is preferably from about 0 to 1, more preferably, from about 0.1 to 0.5, and most preferably from 02. to 0.3. Y is preferably from about 0 to 1, more preferably, from about 0.1 to 0.5, and most preferably from 02. to 0.3.

Also preferred is the at least two of the at least two non-miscible mixed ionic and electronic conductors comprising a material with the nominal composition $(Ln_{1-x}Sr_x)_{1-s}Fe_{1-y}Co_yO_{3-\delta}$, wherein Ln is lanthanide element, Sc or Y. In the formula, x is preferably from about 0 to 1, more preferably, from about 0.1 to 0.5, and most preferably from 02. to 0.3. Y is preferably from about 0 to 1, more preferably, from about 0.1 to 0.5, and most preferably from 02. to 0.3.

The present invention also provides a composite material suitable for use as an electrode material in a solid oxide cell, said composite material being based on $(Gd_{1-x}Sr_x)_{1-s}Fe_{1-y}Co_yO_{3-\delta}$, or $(Ln_{1-x}Sr_x)_{1-s}Fe_{1-y}Co_yO_{3-\delta}$, (s equal to 0.05 or larger) wherein Ln is a lanthanide element, Sc or Y, said composite material comprising at least two phases which are non-miscible, said composite material being obtainable by the glycine nitrate combustion method. In the formula, x is preferably from about 0 to 1, more preferably, from about 0.1 to 0.5, and most preferably from 02. to 0.3. Y is preferably from about 0 to 1, more preferably, from about 0.1 to 0.5, and most preferably from 02. to 0.3.

Due to the use of the glycine nitrate combustion method to obtain the composite of the present invention, the unique structure as outlined above is obtained.

In a further preferred embodiment, the composite material is based on $(Gd_{1-x}Sr_x)_{1-s}Fe_{1-y}Co_yO_{3-\delta}$, more preferably on $(Gd_{0.6}Sr_{4.4})_{1-s}Fe_{0.8}Co_{0.2}O_{3-\delta}$.

The composite material according to the invention may further preferably be a porous material. This is especially advantageous if a high performance is desired.

Moreover, it is preferred that the composite material further comprises a particulate solid electrolyte material, such as doped cerium gadolinium oxide. A particularly preferred material is $Ce_{0.9}Gd_{0.1}O_{1.95}$ (CGO10, Rhodia).

In a second aspect the invention relates to an electrode for use as an electrode for a SOC, wherein the electrode comprises the above composite material. Due to the composite material being employed in the electrode, it is possible to lower the operating temperature of the SOC to an operating temperature of 600° C. or even lower.

Furthermore, due to the specific composite material of the present invention, the electrode advantageously has an electrochemical performance superior as compared to that of the respective two (or more) single-phase perovskites. Thus, the unique microstructure of the composite material of the present invention is essential for achieving a high electrochemical performance regarding the reduction of oxygen or oxidation of hydrogen in a SOC.

In another aspect the invention relates to the use of said composite material as electrode material for a SOC, especially a SOFC.

The invention also relates to a SOC comprising an electrode comprising said composite material. Advantageously, the operating temperature can be lowered when employing the composite material of the present invention as a material for an electrode. Consequently, the material degeneration due to the high temperatures can be reduced. Further, the composite material allows more freedom in selecting materials for the other components, facilitates the use of low cost materials, and contributes additionally to the overall decreased cost of the cell.

In the following, the present invention will be illustrated by examples. The invention is, however, not intended to be limited thereto.

MATERIALS AND METHODS

Example 1

Preparation of a '$(Gd_{0.6}Sr_{0.4})_{0.99}Fe_{0.8}Co_{0.2}O_{3-\delta}$' Perovskite Accordingly to the Invention Powders of iron-cobalt based perovskites having the composition $(Gd_{0.6}Sr_{0.4})_{0.99}Fe_{0.8}Co_{0.2}O_{3-\delta}$ were prepared using the glycine-nitrate combustion route as disclosed by L. A. Chick, L. R. Pederson, G. D. Maupin, J. L. Bates, L. E. Thomas, G. J. Exarhos, in *Materials Letters,* 10 6 (1990).

As starting materials, aqueous solutions of the metal nitrates were used. All nitrates used had a purity of 99% or higher. The appropriate metal nitrate solutions were mixed in the appropriate ratios in a beaker, and glycine was then added to the solution. The solutions were then heated on a hot plate until they ignited. Finally the resulting powders were calcined at 1100° C./12 h. Powder XRD was performed to verify the purity of the synthesised compounds using a Stoe powder diffractometer with $Cu_{K\alpha}$ radiation.

Preparation of Cone Shaped Electrodes

For the fabrication of cones cylinders with a diameter of 10 mm were pressed uni-axially, using an appropriate die. The cylinders were pressed isostatically at a pressure of 60-65 tons. The cylinders were afterwards sintered at 1250° C./12 h before being machined into cones by the use of diamond tools. The density of the cylinders after sintering was determined by the Archimedes method. The density of the cylinders was above 90% of the value determined from XRD.

Cones for the electrochemical measurements were made by machining the cylinders with diamond tools.

As an electrolyte a pellet of $Ce_{0.9}Gd_{0.1}O_{1.95}$ (CGO10, Rhodia) was used. The CGO10 pellet was fabricated as follows: The CGO10 powder was mixed with stearic acid and glycerine in a ball mill with ethanol over night. The mixture was dried before being pressed in a die. The pellet was sintered at 1500° C./2 h.

As a counter/reference electrode a silver electrode was used. For the electrochemical measurements a Solartron 1260 gain phase analyser was used.

Electrochemical impedance spectroscopy (EIS) was recorded in the frequency range 1 MHz to 0.05 Hz with 5 points measured at each decade. The measurements were performed at 800, 700 and 600° C., starting at the highest temperature. Before the recording of the data, the sample was equilibrated at a given temperature for 24 h. The data obtained by EIS were treated in the PC-DOS program equivcrt (B. A. Boukamp, 'equivcrt', University of Twente (1996)). From the intercept at high frequency the contact area was determined using Newman's formula (J. Newman, *J. Electrochem. Soc.,* 113 501 (1966)):

$$r = \frac{1}{4R_s \sigma^*},$$

wherein $R_s$ is the intercept with the real axis at high frequency and $\sigma^*$ is the specific conductivity of the electrolyte. The microstructure of the cone shaped electrodes was investigated using a JEOL JSM-840 scanning electron microscope (SEM).

The powder X-Ray Diffraction (XRD) of the composition was carried out and showed that the $(Gd_{0.6}Sr_{0.4})_{0.99}Fe_{0.8}Co_{0.2}O_{3-\delta}$ compound was at least a two-phase system, one orthorhombic and one cubic perovskite phase.

The electrochemical performance of this composite cathode was found to be very high, namely about 0.89 $\Omega cm^2$ at 600° C. measured on a cone shaped electrode in air as compared with around 100 $\Omega cm^2$ for the single phase material $(La_{0.6}Sr_{0.4})_{0.99}Fe_{0.8}Co_{0.2}O_{3-\delta}$.

Figure 1:
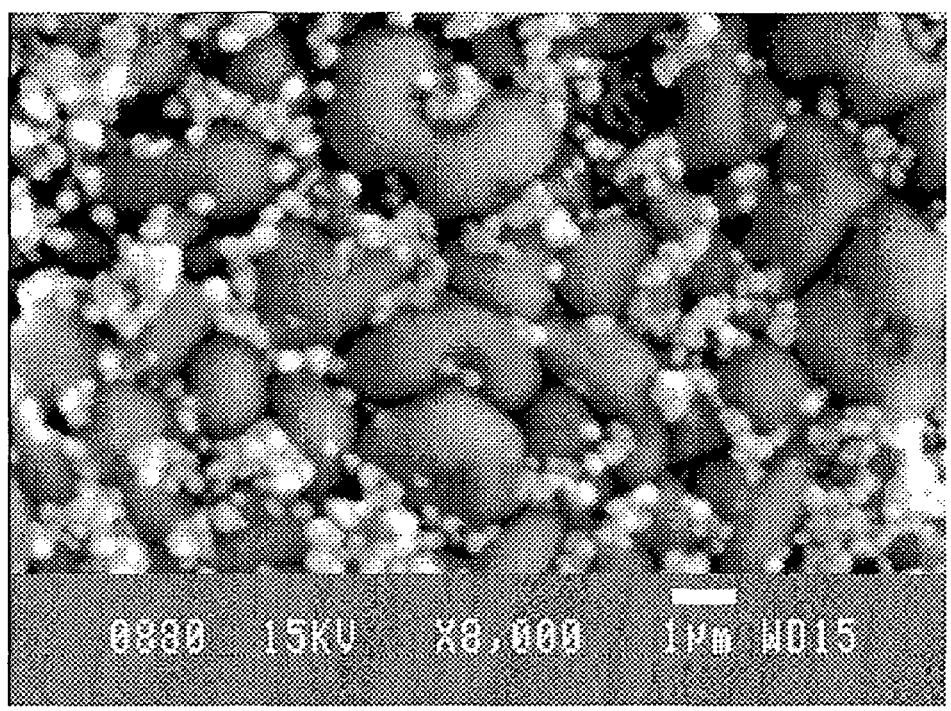
FIG. 1 illustrates the microstructure of a two-phase $(Gd_{0.6}Sr_{0.4})_{0.99}Fe_{0.8}Co_{0.2}O_{3-\delta}$ based composite electrode in accordance with the present invention.

An SEM picture of the cone with the composition $(Gd_{0.6}Sr_{0.4})_{0.99}Fe_{0.8}Co_{0.2}O_{3-\delta}$ is shown in FIG. 1. The obtained cone had a unique microstructure, wherein one phase has a relative large particle size and the other phase has a relatively small particle size and the smaller particles of the second phase are located at the surface of the relatively larger particles of the first phase. The two phases are seen to be well separated.

Using Energy Dispersive X-Ray Analysis (EDX), the compositions of the two phases were determined. The compositions of the two phases were as follows: $Gd_{0.49}Sr_{0.51}Fe_{0.79}Co_{0.24}O_{3-\delta}$ and $Gd_{0.76}Sr_{0.24}Fe_{0.75}Co_{0.22}O_{3-\delta}$, respectively.

In order to evaluate the electrochemical performance of the two individual phases, the pure phases were synthesized. The resulting two phases were single phase materials as verified by powder XRD. After the synthesis of these two phases, the electrochemical performance of the two phases was evaluated using the cone shaped electrode technique by determining the ASR. The electrochemical performance of these two phases and of the cone with the individual composition was significantly lower than the performance of the composite cathode as appears from the ASR values stated in the below Table 1.

The results indicate that the unique microstructure formed when making the composite perovskite is essential for a good electrochemical performance of this type of SOFC cathodes.

TABLE 1

| Sample | ASR/$\Omega cm^2$ at 800° C. |
|---|---|
| "$(Gd_{0.6}Sr_{0.4})_{0.99}Fe_{0.8}Co_{0.2}O_{3-\delta}$" | 0.04 |
| $Gd_{0.49}Sr_{0.51}Fe_{0.79}Co_{0.24}O_{3-\delta}$ | 0.41 |
| $Gd_{0.76}Sr_{0.24}Fe_{0.75}Co_{0.22}O_{3-\delta}$ | 10.0 |

It could be verified that the obtained cathode consisted of at least two perovskite phases and that the composite cathode had much better properties than the two individual phases, indicating that the unique microstructure of the two-phase system is essential for obtaining a high electrochemical performance for the reduction of oxygen in a SOFC.

Example 2

Preparation of Iron-Cobalt Based Perovskites in Accordance with the Invention

Using the glycine-nitrate combustion route of Example 1, additional perovskite powders having the below compositions were prepared and tested.

Powder 2: $(Gd_{1-x}Sr_x)_{0.99}Fe_{0.8}Co_{0.2}O_{3-\delta}$, wherein x=0.2, 0.3, 0.4, 0.5.

The phase purity of all the samples was verified using powder XRD.

The $(Gd_{1-x}Sr_x)_{0.99}Fe_{0.8}Co_{0.2}O_{3-\delta}$ system was found to be a two-phase system (two perovskite phases).

Figure 2:
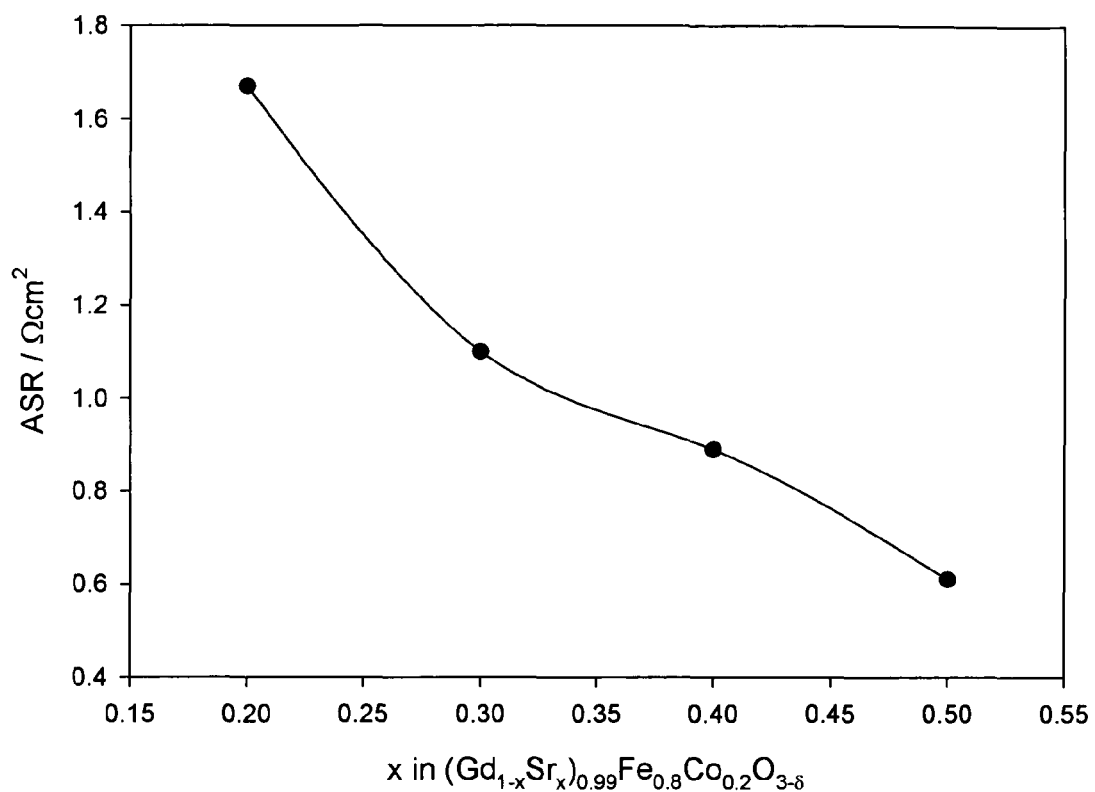
FIG. 2 shows the ASR values of cone shaped electrodes of $(Gd_{1-x}Sr_x)_{0.99}Fe_{0.8}Co_{0.2}O_{3-\delta}$ based cathodes as a function of x measured in air at 600° C.

As explained in Example 1, measurements were performed on cone shaped electrodes. The results can be found in FIG. 2. FIG. 2 shows the ASR values of cone shaped electrodes of $(Gd_{1-x}Sr_x)_{0.99}Fe_{0.8}Co_{0.2}O_{3-\delta}$ based cathodes as a function of x measured in air at 600° C. The ASR values are relatively low for all the compounds.

Example 3

Preparation of Iron-Cobalt Based Perovskites in Accordance with the Invention Using the glycine-nitrate combustion route of Example 1, additional perovskite powders having the below compositions were prepared and tested.

Powder 3: $(Gd_{0.6}Sr_{0.4})_{1-s}Fe_{0.8}Co_{0.2}O_{3-\delta}$, wherein s=0.01, 0.05, 0.1, 0.15, 0.20.

The phase purity of all the samples was verified using powder XRD.

The $(Gd_{0.6}Sr_{0.4})_{1-s}Fe_{0.8}Co_{0.2}O_{3-\delta}$ system was found to be a two-phase system (two perovskite phases).

As explained in Example 1, measurements were performed on cone shaped electrodes. The results can be found in FIG. 3. It is observed that all the compositions had a low ASR, well below the ASR of the single phase compound $(La_{0.6}Sr_{0.4})_{0.99}Fe_{0.8}Co_{0.2}O_{3-\delta}$. However, the strongly A-site deficiently perovskites had a higher ASR than the perovskite with s=0.01.

Figure 3:
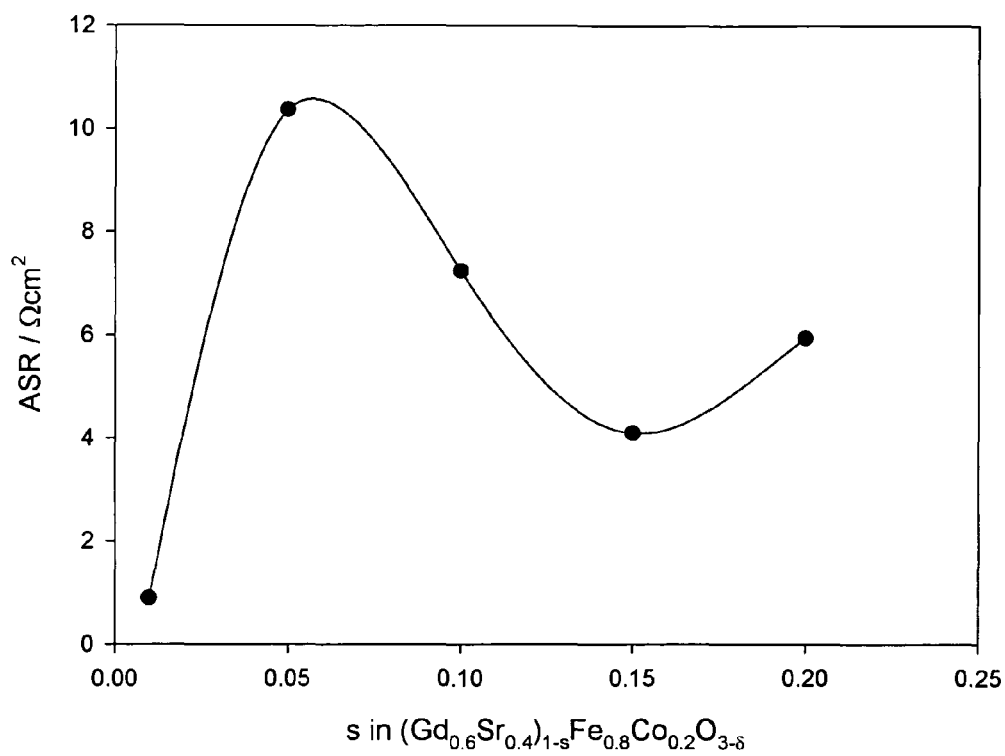
FIG. 3 illustrates the effect of A-site non-stoichiometry on the ASR of two-phase $(Gd_{0.6}Sr_{0.4})_{1-s}Fe_{0.8}Co_{0.2}O_{3-\delta}$ cathodes measured on cone shaped electrodes in air at 600° C.

FIG. 3 illustrates the effect of A-site non-stoichiometry on the ASR of two-phase $(Gd_{0.6}Sr_{0.4})_{1-s}Fe_{0.8}Co_{0.2}O_{3-\delta}$ cathodes measured on cone shaped electrodes in air at 600° C. The ASR is very sensitive to A-site non-stoichiometry of the materials, the ASR being lowest for the compound with s=0.01. However, the ASR values for all the compounds are lower than the ASR values of the single phase compound $(La_{0.6}Sr_{0.4})_{0.99}Fe_{0.8}Co_{0.2}O_{3-\delta}$.

Example 4

Preparation of Iron-Cobalt Based Perovskites in Accordance with the Invention Using the glycine-nitrate combustion route of Example 1, additional perovskite powders having the below compositions were prepared and tested.

Powder 4: $(La_{0.6}Sr_{0.4})_{1-s}Fe_{0.8}Co_{0.2}O_{3-\delta}$, wherein s=0.01, 0.05, 0.10, 0.15, 0.20.

The phase purity of all the samples was verified using powder XRD.

The $(La_{0.6}Sr_{0.4})_{1-s}Fe_{0.8}Co_{0.2}O_{3-\delta}$ system was found to be a two-phase system (two perovskite phases) for s equal to 0.05 and higher.

As explained in Example 1, measurements were performed on cone shaped electrodes. The results can be found in FIG. 4. It is observed that all the compositions had a low ASR, well below the ASR of the single phase compound $(La_{0.6}Sr_{0.4})_{0.99}Fe_{0.8}Co_{0.2}O_{3-\delta}$. However, the strongly A-site deficiently perovskites had a higher ASR than the perovskite with s=0.05.

Figure 4:
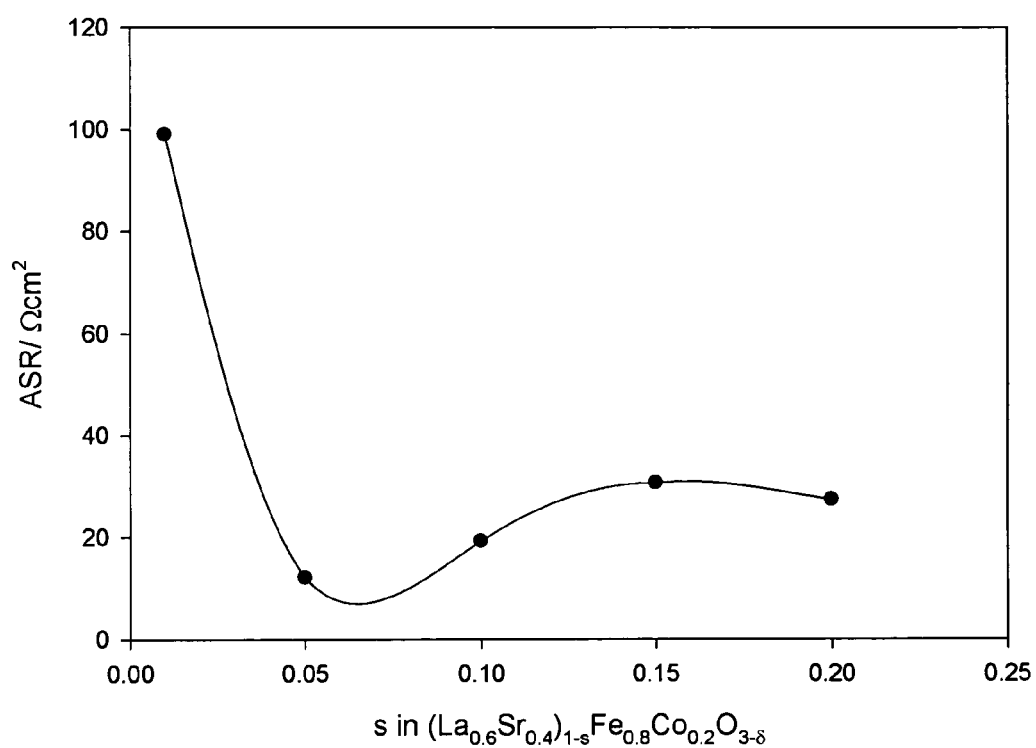
FIG. 4 illustrates the effect of A-site non-stoichiometry on the ASR of two-phase $(La_{0.6}Sr_{0.4})_{1-s}Fe_{0.8}Co_{0.2}O_{3-\delta}$ cathodes measured on cone shaped electrodes in air at 600° C. The compounds with s equal to or higher than 0.05 are at least two phase compounds.

FIG. 4 illustrates the effect of A-site non-stoichiometry on the ASR of two-phase $(La_{0.6}Sr_{0.4})_{1-s}Fe_{0.8}Co_{0.2}O_{3-\delta}$ cathodes measured on cone shaped electrodes in air at 600° C. The compounds with s equal to or higher than 0.05 are at least two phase compounds. These compounds are seen to have lower ASR values than the ASR value of the single phase compound $(La_{0.6}Sr_{0.4})_{0.99}Fe_{0.8}Co_{0.2}O_{3-\delta}$.

Example 5

Preparation of Iron-Cobalt Based Perovskites in Accordance with the Invention Using the glycine-nitrate combustion route of Example 1, additional perovskite powders having the below compositions were prepared and tested.

Powder 5: $(Gd_{0.6}Sr_{0.4})_{0.99}Fe_{0.8}Co_{0.2}O_{3-\delta}$.

The phase purity of the sample was verified using powder XRD.

The $(Gd_{0.6}Sr_{0.4})_{0.99}Fe_{0.8}Co_{0.2}O_{3-\delta}$ system was found to be a two-phase system (two perovskite phases).

Symmetrical cells with a mixture of $(Gd_{0.6}Sr_{0.4})_{0.99}Fe_{0.8}Co_{0.2}O_{3-\delta}$ and CGO10 were prepared as follows. Powder of said perovskite and CGO10 were mixed with solvent and organic compounds in a ball mill. The resulting slurry were sprayed on both sides of a CGO10 tape and sintered in a furnace.

The measurements on the resulting samples were performed as follows. A Pt paste was added on both sides of the cells as a current collected. The cells were then placed in a set-up with Pt-meshes and a spring loaded load. The measurements were then undertaken as explained in Example 1.

Figure 5:
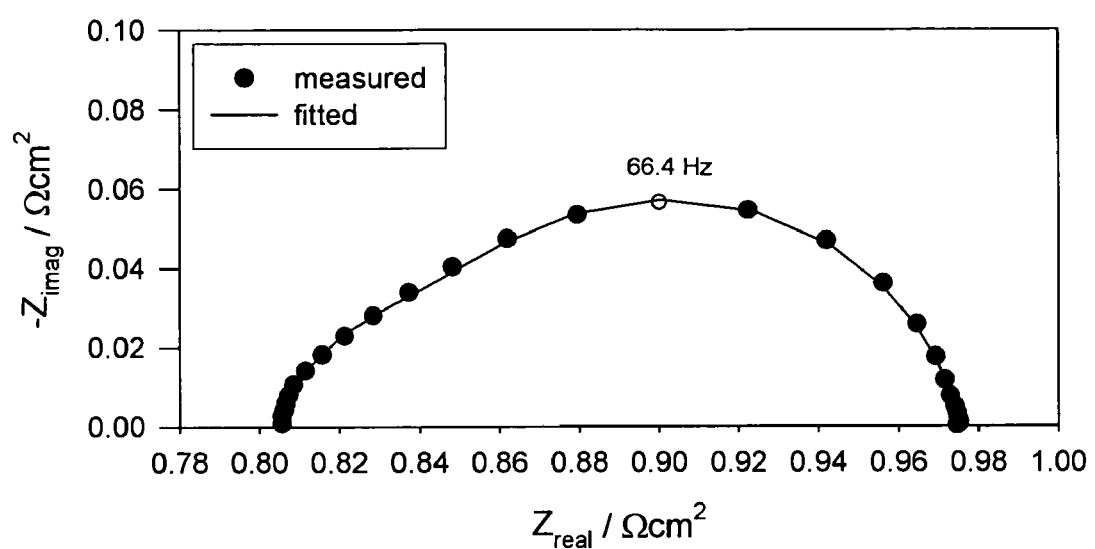
FIG. 5 shows an example of an electrochemical impedance spectrum of a $(Gd_{0.6}Sr_{0.4})_{0.99}Fe_{0.8}Co_{0.2}O_{3-\delta}$/CGO composite cathode measured at 600° C. in air. The ASR is seen to be very low.

In FIG. 5, the impedance spectrum as recorded at 600° C. on a $(Gd_{0.6}Sr_{0.4})_{0.99}Fe_{0.8}Co_{0.2}O_{3-\delta}$/CGO10 composite cathode is shown. The ASR is around 0.16 $\Omega cm^2$, and even lower values were found for other compositions of $(Gd_{0.6}Sr_{0.4})_{0.99}Fe_{0.8}Co_{0.2}O_{3-\delta}$/CGO10 composite cathodes. This is lower than the ASR for a $La_{0.6}Sr_{0.4}Fe_{0.8}Co_{0.2}O_{3-\delta}$/CGO10 cathode.

FIG. 5 shows an example of an electrochemical impedance spectrum of a $(Gd_{0.6}Sr_{0.4})_{0.99}Fe_{0.8}Co_{0.2}O_{3-\delta}$/CGO composite cathode measured at 600° C. in air. The ASR is seen to be very low.

The invention claimed is:

1. A composite material suitable for use as an electrode material in a solid oxide cell, said composite material comprising $(Gd_{1-x}Sr_x)_{1-s}Fe_{1-y}Co_yO_{3-\delta}$ or $(Ln_{1-x}Sr_x)_{1-s}Fe_{1-y}Co_yO_{3-\delta}$, with s equal to at least 0.05 or larger; x is from 0 to 1; y is from 0 to 1; wherein Ln is a lanthanide element, Sc or Y; said composite material comprising at least two phases which are non-miscible, wherein the first of the at least two phases has a particle size of from 0.5 to 60 μm, and the second of the at least two phases has a particle size of less than 0.5 μm, and wherein a particle of the second phase is located at the surface of a particle of the first phase.

2. The composite material according to claim 1 further comprising a particulate solid electrolyte material.

3. The composite material according to claim 2, wherein the electrolyte material is a doped cerium gadolinium oxide.

4. The composite material according to any of claim 1, 2 or 3, wherein the composite material is porous.

5. An electrode for a solid oxide cell, comprising the composite material of claim 1.

6. A method of preparing a solid oxide cell comprising forming an electrode that comprises the composite material of claim 1 as an electrode material for the solid oxide cell.

7. A solid oxide fuel cell comprising an electrode comprising the composite material of claim 1.

8. An electrode for a solid oxide cell, comprising the composite material of claim 4.

9. A method of preparing a solid oxide cell comprising forming an electrode that comprises the composite material of claim 4 as an electrode material for the solid oxide cell.

10. A solid oxide fuel cell comprising an electrode comprising the composite material of claim 4.

* * * * *